United States Patent Office 2,832,776
Patented Apr. 29, 1958

2,832,776

AMINO DERIVATIVES OF ISOVALERIC ACID

Henri Morren, Forest-Brussels, Belgium, assignor to Union Chimique Belge, Société Anonyme, Brussels, Belgium, a Belgian company No Drawing. Application May 21, 1956
Serial No. 585,966

Claims priority, application Belgium June 27, 1955

10 Claims. (Cl. 260—247.2)

The present invention relates to amino derivatives of 2-phenyl-isovaleric acid esters and the process for the preparation thereof.

These compounds have the general formula

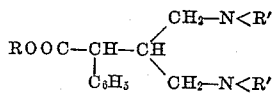

in which R represents a radical selected from the group comprising alkyl, aralkyl, aminoalkyl and aminoalkoxyalkyl substituted on the nitrogen radicals, —N<R' represents a secondary aliphatic or heterocyclic amine group.

The compounds of the present invention have a remarkable analgesic power, and they have the appreciable advantage of not causing toxicomania.

The compounds of the present invention are obtained by reacting the 2-halogeno derivatives of 1,3-disubstituted-propane on the monosodium derivative of an alkyl phenylacetate or of phenylacetonitrile. In the latter case, this condensation is followed by conversion of the nitrile obtained into acid and by subsequent esterification.

The higher esters are prepared by direct esterification or by transesterification from the ethyl ester.

*Example 1.—Ethyl 2-phenyl-4,4'-bis-(dimethylamino)-isovalerate*

55 gr. of ethyl phenylacetate are dissolved in 50 ml. of toluene. This solution is added to a suspension of 11.7 gr. of sodamide in 100 ml. of toluene. The mixture is heated over a water-bath until the evolution of ammonia has ceased. After cooling, 58 gr. of 1,3-bis-(dimethylamino)-2-chloropropane are added dropwise (B. P. 70° C./15 mm. Hg) dissolved in 50 ml. of toluene. This mixture is then heated under reflux for one hour.

After cooling, the reaction product is washed with water to separate the sodium chloride. Extraction is effected by means of 2 N hydrochloric acid. After decanting, the acid solution is washed with benzene, and is made alkaline by a concentrated potassium carbonate solution. The isovalerate is extracted with benzene.

The benzene solution is concentrated and the residue is rectified under a high vacuum. 29 gr. of ethyl 2-phenyl-4,4'-bis-(dimethylamino)-isovalerate are finally recovered (B. P. 113–115° C./0.02 mm. Hg).

*Example 2.—Ethyl 2-phenyl-4,4'-bis-(diethylamino)-isovalerate*

A toluenic suspension of sodamide is prepared from 138 gr. of metallic sodium. 705 gr. of phenylacetonitrile dissolved in 500 ml. of toluene are added thereto. After formation of the monosodium derivative of phenylacetonitrile and completion of the evolution of ammonia, 1348 gr. of 1,3-bis-(diethylamino)-2-chloropropane in toluenic solution are introduced. The mixture is heated under reflux for 3 hours.

After cooling, the reaction product is washed with water and the toluenic solution is extracted by means of 2 N hydrochloric acid. The acid solution is made alkaline with caustic soda and the amino nitrile is extracted with benzene. The benzene solution is concentrated and rectified in vacuo. 1583 gr. of 2-phenyl-4,4'-bis-(diethylamino)-isovaleronitrile are obtained (B. P. 142° C./0.5 mm. Hg).

1140 gr. of this nitrile are dissolved in a solution of 1570 ml. of concentrated sulphuric acid and 450 ml. of water. The whole is heated at 125–130° C. for 3 hours, whereafter absolute ethanol is added while a mixture of ethanol and water distills. The esterification is complete when the distillate is absolute ethanol.

After cooling, 10 litres of a 40% solution of caustic soda are added, care being taken to stir the mass, which is maintained below 10° C. Benzene is then added and the mixture is decanted. Finally, the benzenic solution is distilled and is rectified in vacuo. 810 gr. of ethyl 2-phenyl-4,4'-bis-(diethylamino)-isovalerate (B. P. between 138° and 140° C./0.02 mm. Hg) are thus obtained.

*Example 3.—Methyl 2-phenyl-4,4'-bis-(diethylamino)-isovalerate*

The procedure of Example 2 is followed, but the esterification is effected with absolute methanol. The product obtained has a boiling point of 140° C./0.5 mm. Hg.

*Example 4.—Ethyl 2-phenyl-4,4'-bis-(N-piperidino)-isovalerate*

1,3-bis-(N-piperidino)-2-chloropropane (B. P. 110–112° C./0.2 mm. Hg) is prepared by reacting 1,3-bis-(N-piperidino)-2-propanol with thionyl chloride in a chloroformic medium. The product obtained then reacts with phenylacetonitrile as described in Example 2 to form 2-phenyl-4,4'-bis-(N-piperidino)-isovaleronitrile (B. P. 170° C./0.05 mm. Hg).

25 gr. of this nitrile are hydrolysed by heating under reflux for 24 hours in the presence of 200 ml. of hydrobromic acid containing 47% of HBr.

The mixture is evaporated to dryness and the residue is taken up in 30 ml. of sulphuric acid containing 90% of $H_2SO_4$, and esterified by absolute ethanol in the same manner as in Example 2.

18 gr. of ethyl 2-phenyl-4,4'-bis-(N-piperidino)-isovalerate (B. P. 175° C./0.05 mm. Hg) are finally separated.

*Example 5.—Ethyl 2-phenyl-4,4'-bis-(N-morpholino)-isovalerate*

A mixture of one mole of 1,3-dichloro-2-propanol and five moles of morpholine is heated at 150° C. in an autoclave. 1,3-bis-(N-morpholino)-2-propanol (B. P. 145–150° C./0.2 mm. Hg) is obtained. This product is chlorinated by means of thionyl chloride in a chloroformic medium. The 1,3-bis-(N-morpholino)-2-chloropropane decomposes on distillation. It has been used in the crude state for the reaction with the monosodium derivative of phenylacetonitrile and the preparation of 2-phenyl-4,4'-bis-(N-morpholino)-isovaleronitrile (B. P. 198° C./0.3 mm. Hg).

40 gr. of this nitrile, 40 gr. of caustic potash and 120 ml. of methanol are heated at 185° C. for 8 hours in an autoclave.

After cooling, 100 ml. of water are added and the mixture is concentrated to a volume of about 100 ml. The potassium 2-phenyl-4,4'-bis-(N-morpholino)-isovalerate is decanted, 50 ml. of sulphuric acid, containing 90% of $H_2SO_4$ is added thereto dropwise. The mixture is thereafter esterified with absolute ethanol as described in Example 2. 30 gr. of ethyl 2-phenyl-4,4'-bis-(N-morpholino)-isovalerate are finally obtained (B. P. 203° C./0.1 mm. Hg).

*Example 6.—Ethyl 2-phenyl-4,4'-bis-(di-n-propylamino)-isovalerate*

Phenylacetonitrile and 1,3-bis-(di-n-propylamino)-2-chloropropane (B. P. 125° C./2 mm. Hg) are reacted as in Example 5.

The nitrile obtained (B. P. 170° C./1 mm. Hg) is saponified and esterified to form ethyl 2-phenyl-4,4'-bis-(di-n-propylamino)-isovalerate (B. P. 160° C./0.3 mm. Hg).

*Example 7.—Ethyl 2-phenyl-4,4'-bis-(diisopropylamino)-isovalerate*

The process of preparation is the same as that of Example 5. New products are:

1,3-bis-(diisopropylamino)-2-chloropropane (B. P. 105° C./0.05 mm. Hg)
2-phenyl - 4,4' - bis - (diisopropylamino) - isovaleronitrile (B. P. 148° C./0.3 mm. Hg)
Ethyl 2-phenyl - 4,4' - bis-(diisopropylamino)-isovalerate (B. P. 152° C./0.3 mm. Hg)

*Example 8.—Ethyl 2-phenyl-4,4'-bis-(di-n-butylamino)-isovalerate*

The process of preparation is the same as that of Example 5. New products are:

1,3-bis-(di-n-butylamino)-2-chloropropane (B. P. 140° C./0.1 mm. Hg)
2-phenyl-4,4'-bis-(di-n-butylamino)-isovaleronitrile (B. P. 170–172° C./0.1 mm. Hg)
Ethyl 2-phenyl - 4,4' - bis-(di-n-butylamino)-isovalerate (B. P. 173–175° C./0.05 mm. Hg)

*Example 9.—n-Butyl 2-phenyl-4,4'-bis-(diethylamino)-isovalerate*

A mixture of 25 gr. of ethyl 2-phenyl-bis-(diethylamino)-isovalerate (prepared in accordance with Example 2), 0.15 gr. of sodium and 50 ml. of anhydrous n-butanol is heated under reflux for 8 hours in a stream of nitrogen, and the liberated ethanol is distilled. Finally, 50 ml. of anhydrous n-butanol are added dropwise and distilled to eliminate the last traces of ethanol.

The residue is extracted with ether. The product is washed several times with water and dried. The ether is evaporated and the residue is distilled under a high vacuum. 15 gr. of n-butyl 2-phenyl-4,4'-bis-(diethylamino)-isovalerate are obtained (B. P. 145° C./0.005 mm. Hg).

*Example 10.—Benzyl 2-phenyl-4,4'-bis-(diethylamino)-isovalerate*

The process of Example 9 is applied, but benzyl alcohol is used instead of n-butanol. The corresponding benzyl ester is obtained (B. P. 170° C./0.005 mm. Hg).

*Example 11.—2-(diethylamino)-ethyl 2-phenyl-4,4'-bis-(diethylamino)-isovalerate*

47 gr. of 2-(diethylamino)-ethanol are heated until a few drops are distilled to ensure complete dehydration. 0.2 gr. of sodium is added thereto, followed by 35 gr. of ethyl 2-phenyl-4,4'-bis-(diethylamino)-isovalerate. The mixture is progressively heated and the ethanol formed is slowly distilled, and then the 2-diethylaminoethanol. The residue is taken up in benzene and in a saturated sodium chloride solution. The benzenic solution is decanted. On distillation under a high vacuum, the 2-diethylaminoethyl ester (B. P. 161–163° C./0.02 mm. Hg) is obtained with a 70% yield.

*Example 12.—[2-(2-diethylamino)-ethoxy]-ethyl 2-phenyl-4,4'-bis-(diethylamino)-isovalerate*

The procedure of Example 11 is followed, but [2-(2-diethylamino)-ethoxy]-ethanol is used instead of 2-(diethylamino)-ethanol. The required ester boiling at 190° C./0.01 mm. Hg is obtained.

I claim:

1. Amino derivatives of 2-phenyl-isovaleric acid of the general formula

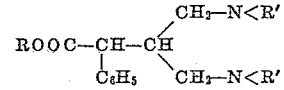

wherein R represents a member selected from the group consisting of alkyl containing from 1 to 4 carbon atoms, benzyl, 2-(diethylamino)-ethyl and [2-(2-diethylamino)-ethoxy]-ethyl radicals, and R' is a member selected from the group consisting of dialkylamino in which the alkyls contain from 1 to 4 carbon atoms, piperidino and morpholino radicals.

2. Ethyl 2-phenyl-4,4'-bis-(dimethylamino)-isovalerate.
3. Ethyl 2-phenyl-4,4'-bis-(diethylamino)-isovalerate.
4. Methyl 2-phenyl-4,4'-bis-(diethylamino)-isovalerate.
5. Ethyl 2-phenyl-4,4'-bis-(N-morpholino)-isovalerate.
6. [2-(2-diethylamino)-ethoxy]-ethyl 2-phenyl-4,4'-bis-(diethylamino)-isovalerate.

7. Preparation of amino derivatives of 2-phenyl-isovaleric acid, wherein the monosodium derivative of phenyl-acetonitrile is reacted with a compound of 1,3-diamino-2-chloropropane, the 2-phenyl-4,4'-diaminoisovaleronitrile is hydrolysed and the acid obtained is esterified.

8. Process according to claim 7, wherein the hydrolysis of the nitrile takes place in an acid medium.

9. Process according to claim 7, wherein the hydrolysis takes place in an alkaline medium.

10. A process for the preparation of an amino derivative of 2-phenyl-isovaleric acid wherein an ester of the formula

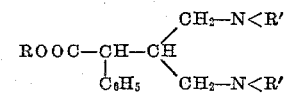

in which R represents a radical selected from the group consisting of methyl and ethyl radicals, and R' is a member selected from the group consisting of dialkylamino in which the alkyls contain from 1 to 4 carbon atoms, piperidino and morpholino radicals, is heated in the presence of an alcohol selected from the group consisting of butanol, benzyl alcohol, 2-(diethylamino)-ethanol and [2-(2-diethylamino)-ethoxy]-ethanol, whereby the more volatile alcohol corresponding to the alcohol moiety contained in the initial ester distills off.

References Cited in the file of this patent

UNITED STATES PATENTS 2,510,784    Lucas _____ June 6, 1950

OTHER REFERENCES

Slotta et al.: Chemical Abstracts, vol. 29, page 4768 (1935).